United States Patent [19]
Weinstein

[11] Patent Number: 5,337,473
[45] Date of Patent: Aug. 16, 1994

[54] INVENTORY ASSEMBLY WORK STATION TABLE

[76] Inventor: Stephen G. Weinstein, 10795 Miguelito Rd., San Jose, Calif. 95127

[21] Appl. No.: 56,657

[22] Filed: May 3, 1993

[51] Int. Cl.$^5$ ............... B23P 21/00; B65B 57/10; B65B 57/18
[52] U.S. Cl. .................... 29/720; 29/407; 53/168; 53/494; 53/508
[58] Field of Search ............ 29/407, 720; 53/168, 53/493, 494, 495, 499, 501, 508; 364/403, 478, 479; 221/3, 5, DIG. 1

[56] References Cited

U.S. PATENT DOCUMENTS

| | | | |
|---|---|---|---|
| 2,277,929 | 3/1942 | Meyer | 312/235.2 |
| 3,727,372 | 4/1973 | Roberts | 53/502 |
| 3,739,447 | 6/1973 | Halliday | 29/721 |
| 4,870,799 | 10/1989 | Bergerioux et al. | 53/168 X |
| 5,230,206 | 7/1993 | Christ | 53/501 |

FOREIGN PATENT DOCUMENTS 3-288497 12/1991 Japan ................ 29/720

*Primary Examiner*—Mark Rosenbaum
*Assistant Examiner*—S. Thomas Hughes
*Attorney, Agent, or Firm*—Fliesler, Dubb, Meyer & Lovejoy

[57] ABSTRACT

A work station table wherein inventory articles to be integrated into a product are placed on the table, with each type of article being located next to one of a plurality of detector cards set in the table (one type of article per card). Each detector card is capable of detecting movement, and when an operator reaches across a detector card to retrieve the inventory article located next to that sensor, the movement of his or her hand or selected article is detected by the sensor. The movement causes a light emitting diode (LED) in the detector card to light, thereby indicating that the inventory article corresponding to that detector card has been selected. The table further includes an accumulator card having an LED display and numbers corresponding to each of the detector cards. In addition to registering at each of the sensors, retrieval of an article from a particular inventory point will cause a corresponding number to light on the accumulator card. Upon completion of one selection cycle, the system is manually reset and the process is repeated. If an inventory point has been missed (as indicated by the corresponding LED on the detector card and accumulator card not being lit) the system will not allow the LEDs to be reset and a buzzer or visual alarm will be activated. In this way incomplete assembly and/or packaging may be avoided.

23 Claims, 6 Drawing Sheets

INVENTORY ASSEMBLY WORK STATION TABLE

BACKGROUND OF THE INVENTION

1. Field of the Invention

The present invention relates to a work station table, and in particular a work station table wherein electronic sensors facilitate the assembly or packaging of inventory articles positioned on the table.

2. Description of Related Art

Mass production of products from individual product parts is often accomplished manually with the aid of work station tables. In general, the individual product parts, commonly referred to as inventory articles, are provided on the work station table, where an operator selects one or more of each type of article and integrates them together to form a final product. By providing a large quantity of each type of inventory article on the table, the process may be continuously repeated and a large quantity of final products may be quickly and efficiently obtained.

Automated assembly lines, such as that disclosed in U.S. Pat. No. Re 25,886 for example, are well known for product mass production. Such mass production systems generally include a transport mechanism for transporting a component to a plurality of stations at each of which a particular assembly function is carried out by a machine. Such systems have the disadvantage that they may not generally be configured to mass produce different products, but rather may only mass produce the one product for which it was designed. Moreover, a defect in any one station may shut down the entire production line. Furthermore, such systems are generally expensive to implement, and their complex design makes them difficult and expensive to repair.

Conversely, work station tables for manual product assembly are relatively inexpensive and may mass produce any number of diverse products, depending on what inventory articles are provided on the table for integration. However, mass production of products with conventional work station tables is accomplished by human operators, and as such, mistakes in the selection of inventory articles are a significant problem. For example, an inventory article may be inadvertently left out of the final product, or an inventory article may inadvertently be selected twice. Another problem with conventional work station tables is that, in an effort to reduce the rate of defective product production, the number of different inventory articles placed before any given operator for integration is kept low, generally about 2 to 3 articles. This places a significant limitation on the rate at which products may be mass produced.

SUMMARY OF THE INVENTION

It is therefore an object of the present invention to provide a work station table for manual integration of inventory articles into a product in which integration is quickly and efficiently accomplished.

It is a further object of the present invention to provide such a work station table wherein defective integration of inventory articles is eliminated by a system which indicates when defective integration has occurred and allows the operator to correct the problem.

It is another object of the present invention to provide such a work station whereby products are produced at a high rate.

It is a still further object of the present invention to provide a work station table which is convenient and comfortable to use for the operator.

It is another object of the present invention to provide a work station table which is relatively easy and inexpensive to manufacture.

These and other objects are accomplished by the present invention, which relates to a work station table wherein inventory articles located on an arcuate-shaped table are taken from the table and integrated together by an operator standing at the center of the table. The integration of the inventory articles may, for example, be for the purposes of assembling the inventory articles into a single unit, or for packaging the inventory articles together for shipment. A plurality of articles to be integrated are placed on the table, with each article being located next to one of a plurality of detector cards set in the table (one type of article per card). Each detector card is capable of detecting movement, and when an operator reaches across a detector card to retrieve the inventory article located next to that sensor, the movement of his or her hand or the selected inventory article is detected by the sensor. The movement causes a light emitting diode ("LED") in the detector card to light, thereby indicating that the inventory article corresponding to that detector card has been retrieved.

The table further includes an accumulator card having an LED display and numbers corresponding to each of the detector cards. In addition to registering at each of the sensors, retrieval of an article from a particular inventory point will cause a corresponding number to light on the accumulator card. Upon completion of one selection cycle, the system is manually reset by a pushbutton switch and the process is repeated. If an inventory point has been missed (as indicated by the corresponding LED on the detector card and accumulator card not being lit) the reset switch will not allow the LEDs to be reset and a buzzer will sound. In this way incomplete assembly and/or packaging may be avoided.

The work station table includes a table top surface in which the detector cards and accumulator card are located, inventory space underneath the table, electrical cabinets encasing the power supply couplings and a light above the table for illuminating the work space and for providing a uniform light source for the table sensors. In addition to providing easy access to each of the inventory articles on the table, the arcuate shape of the table allows a plurality of work stations to fit together in a zig-zag fashion to form a row of interconnected work station tables.

BRIEF DESCRIPTION OF THE DRAWINGS

The present invention will now be described with reference to the accompanying figures, in which.

DESCRIPTION OF PREFERRED EMBODIMENTS

The present invention will now be described in reference to FIGS. 1 through 9, which generally disclose a work station table, including a plurality of light sensitive detector cards for ensuring complete integration of inventory articles to form a final product. The integration of the inventory articles is generally for the purposes of assembling the inventory articles into a single unit, or for packaging the inventory articles together for shipment. It is understood, however, that the present invention may generally be utilized any time it is desired to bring together a plurality of objects into a group.

Figure 1:
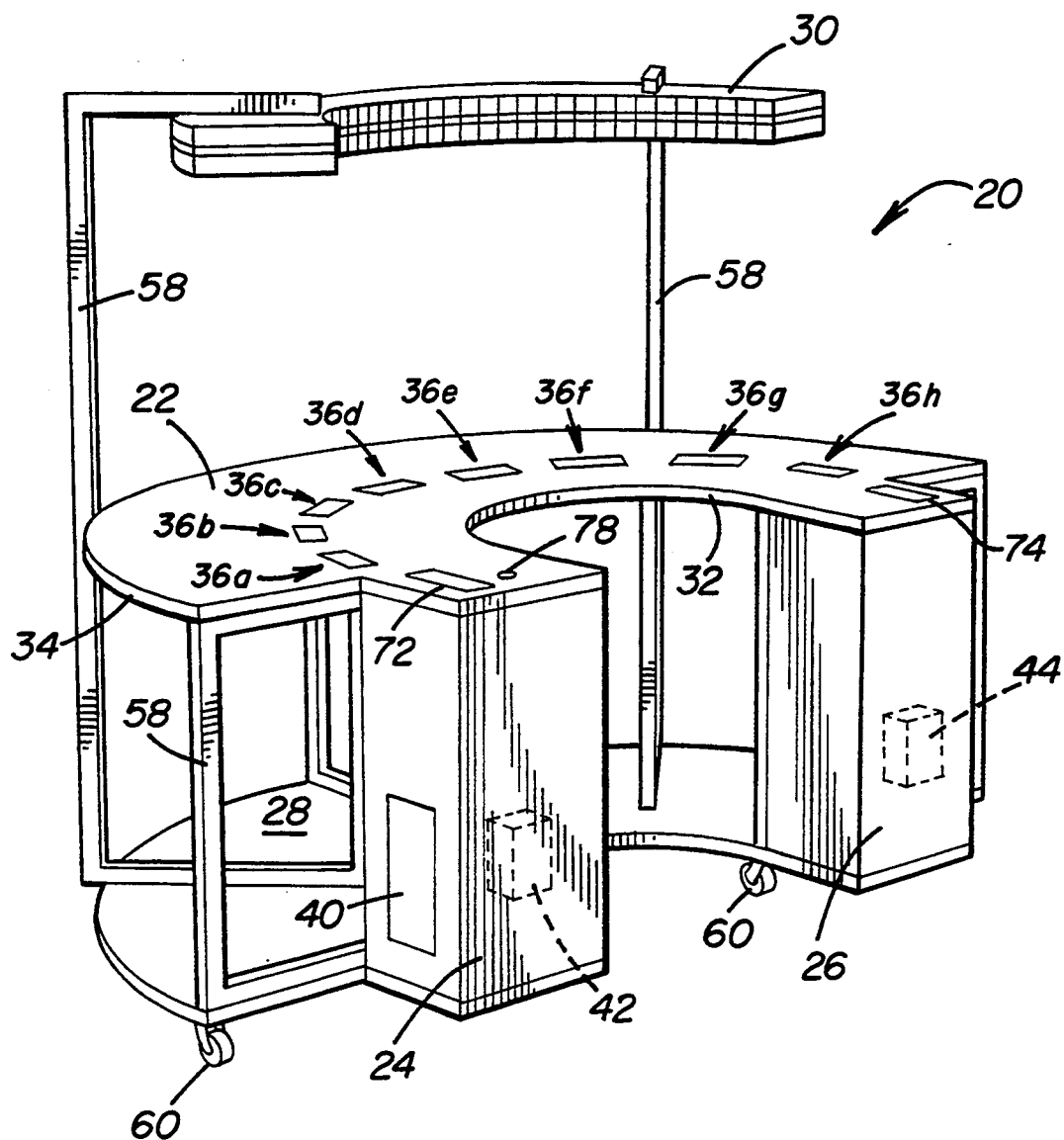
FIG. 1 is an isometric view of a work station according to the present invention.
Figure 2:
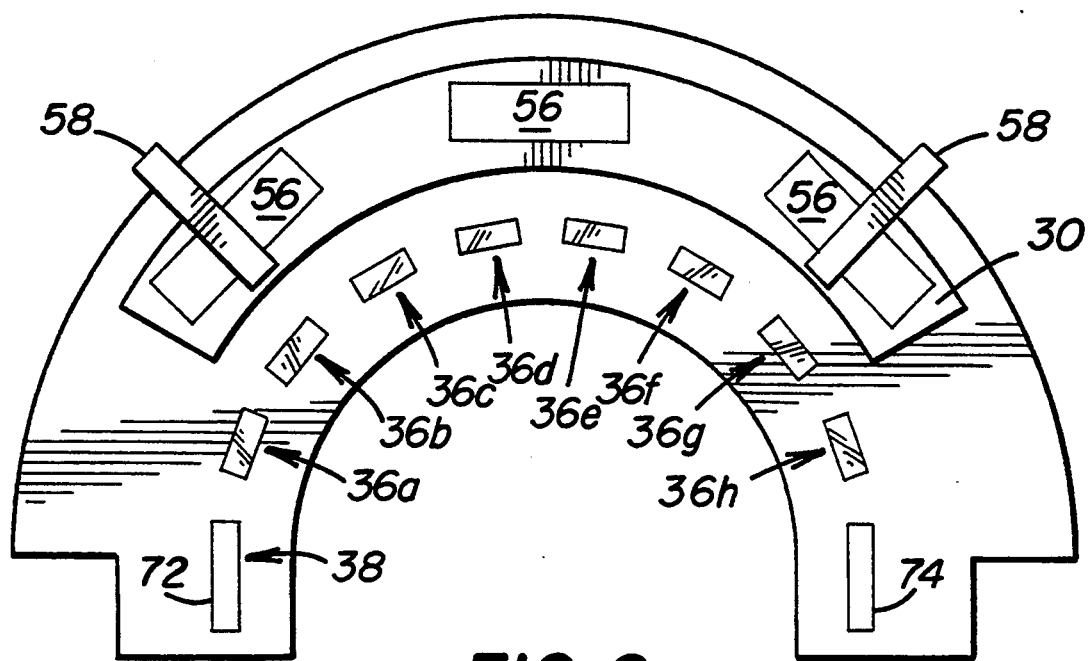
FIG. 2 is a top view of the work station shown in FIG. 1.

Referring now to FIG. 1, there is shown a work station table 20 including a table top 22, electrical cabinets 24 and 26, inventory storage space 28 and hood 30. Table top 22 includes generally arcuately shaped front and rear edges 32 and 34, respectively. The shape of table top 22 is ergonomically provided to allow an operator standing in front of front edge 32 (not shown) equal access to all inventory articles placed on the table. The distance from front edge 32 to rear edge 34 is generally approximately 32 inches, and the table may preferably be approximately 96 inches across at its widest point. It is of course understood, however, that the distance from front edge 32 to rear edge 34 and the dimension of the table accross its widest point may be greater or lesser than that disclosed above and still be within the scope of the invention. Table top 22 may be comprised of any of several materials which may be easily formed into the arcuate shape and having sufficient structural rigidity. A preferred material for use is 1⅛ inch thick press board with a smooth laminate layer bonded to the upper surface. Table top 22 is preferably provided with a plurality of inventory points at which like inventory articles may be provided and further including slots in which detector cards 36$_{a-h}$ are located. Table 20 further includes slots 72 and 74 at either end of the table top 22 for receiving accumulator card 38. The slots in which detector cards 36$_{a-h}$ are located may generally be formed in the table top 22 about 12 inches from front edge 32 and preferably about 12 inches from each other. As shown in FIGS. 1 and 2, each slot in table top 22 may preferrably be rectangular. However, it is understood that the slots in table top 22 may be formed into various shapes and still be within the scope of the invention.

Figure 3:
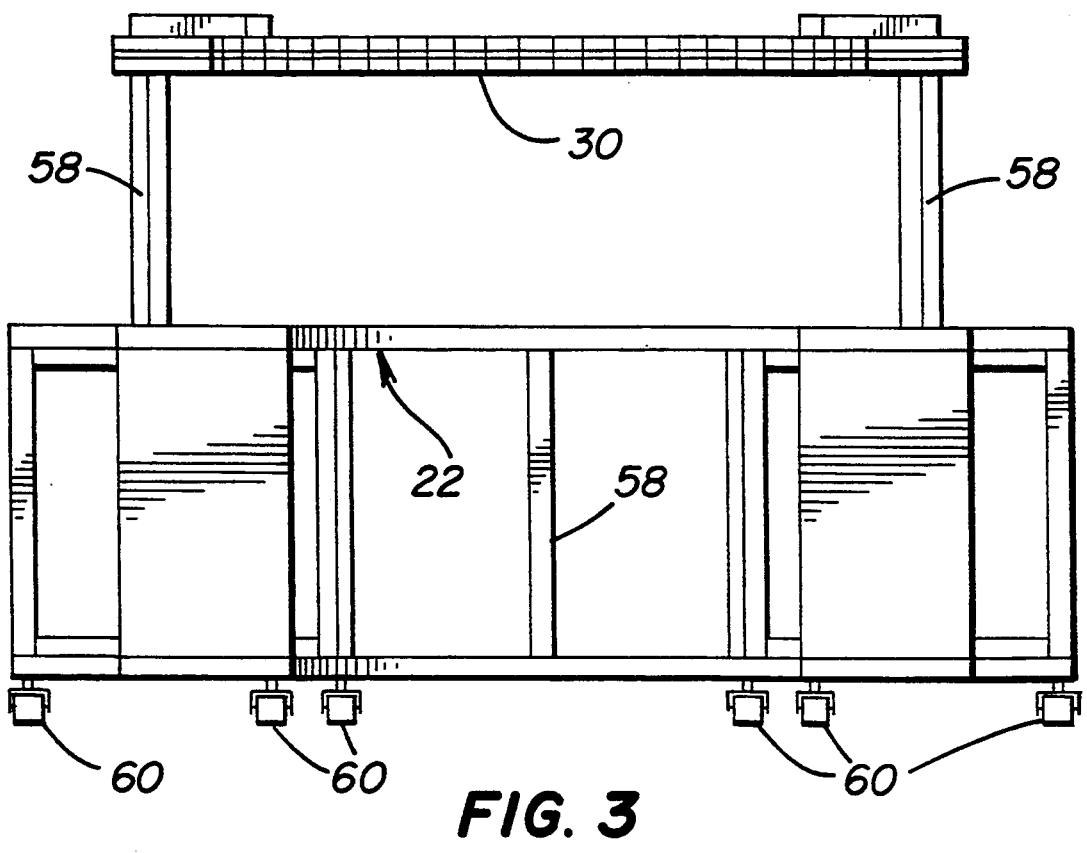
FIG. 3 is a front view of the work station shown in FIG. 1.
Figure 4:
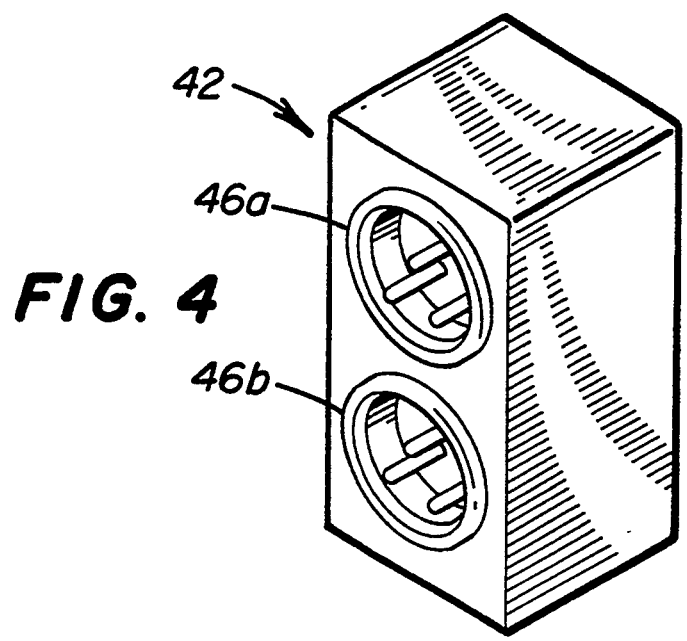
FIG. 4 is an isometric view of a power coupling included in the present invention.

As shown in FIGS. 1 through 3, electrical cabinets 24 and 26 each define a generally rectangular shape enclosure with a side door 40 for gaining access to the interior of cabinets 24 and 26. The cabinet 24 and cabinet 26, which are identical, may each be comprised of 16 GA steel or similar material and be affixed to the table 20 by conventional screw, adhesive or any other comparable means. The cabinets provide an enclosure for power supply couplings 42 and 44, located inside cabinets 24 and 26, respectively. The cabinets 24 and 26 further provide a storage space for cables and other miscellaneous items associated with work table station 20. As shown in FIG. 4, power supply coupling 42, which is identical to power supply coupling 44, includes two power outlets 46a and 46b. Work station table 20 receives power via a power cable (not shown) which connects with a conventional 110 volt power supply source at one end and either power outlet 46a or 46b at the other end.

As will be described hereinafter, several work station tables 20 may be linked together, with each table 20 receiving power in series from the conventional 110 volt supply source. Where a second unit is connected to a first unit, the first unit receives power via power cable connecting with either power outlet 46a or 46b as described above. The second unit receives power via a connector cable (not shown) which connects between the unused power outlet 46a or 46b in the first unit and a power outlet 46a or 46b in the second unit. In this manner, any number of work station tables 20 may be electrically connected via the connector cables. The power cable may be approximately 20 feet long and the connector cables may each be about 27 inches long. Both ends of both the power cable and connector cables include female connecting pieces. Providing the power or connector cables with a male connecting piece presents the danger of an electric shock to an operator, as when the operator handles the male connecting piece when the other end of the cable is directly or indirectly connected to the power source. A special power source adaptor may be provided with male connecting pieces at both ends to connect to the conventional power source and either end of the power cable.

The work station table 20 may further include an inventory shelf 28 of similar shape and construction to table top 22. The inventory shelf 28 may preferably be comprised of any of several materials which may be easily formed into the preferred shape and which includes a high degree of structural rigidity. A preferred material is 1⅛ inch pressboard having a laminated top surface. Normally, during the mass production process, additional inventory articles are brought to a table 20 and placed on table top 22 behind the appropriate sensor 36$_{a-h}$ so as to replenish the stock of inventory articles. However, inventory shelf 28 is provided for storing excess inventory articles when there is no room on table top 22 or for storing inventory articles which are not part of the present article assembling process.

Hood 30 may preferably be formed of metal or molded fiberglass and, as shown in FIG. 2, may include three fluorescent or other type lamps 56 on its underside. The lamps 56 serve a dual purpose. First, they serve to illuminate the area so that the operator may more easily identify the inventory articles. Second, the lamps 56 provide a constant and uniform source of light to act as a reference light for the sensors 36$_{a-h}$. Thus, a constant and uniform light from lamps 56 will always be received in sensors 36$_{a-h}$, unless the light is obstructed, as by movement of a hand or inventory article across a particular sensor. Hood 30 is preferably located about 30 inches over table top 22 and is arcuately-shaped similar to table top 22. Both hood 30 and table top 22 are supported by support members 58, which are in turn supported on inventory shelf 28. Support members 58 may preferably be comprised of a lightweight, structurally rigid material, such as 1½ inch steel tubing.

Work station table 20 may further include a plurality of casters 60 mounted on the underside of inventory shelf 28 so as to allow work station table 20 to be easily moved as desired. A caster 60 may preferably be 2 inches in diameter and each work station table 20 may preferably include six such casters.

Figure 5:
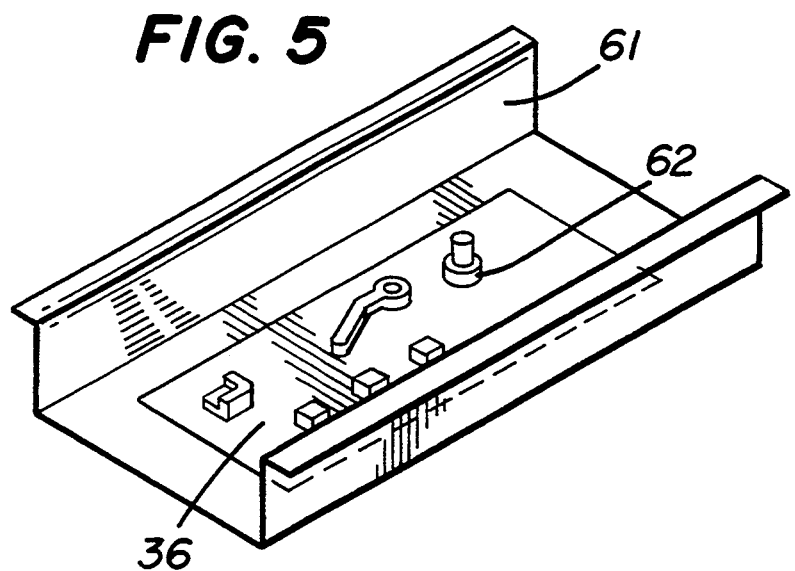
FIG. 5 is an isometric view of a detector card and trough included in the present invention.
Figure 6:
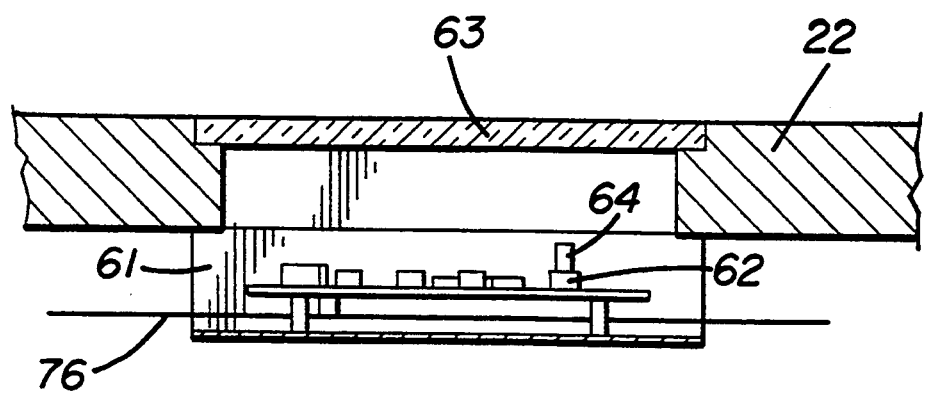
FIG. 6 is a cross sectional side view of a detector card and trough included in the present invention.

As previously stated, the table top 22 includes a plurality of inventory points including slots for receiving sensors in the form of detector cards $36_{a-h}$. In a preferred embodiment, each work station table 20 includes 8 inventory points, each point having a detector card, but it is understood to be within the scope of the invention that the number of inventory points on a table 20 may be more or less than 8. As shown in FIGS. 5 and 6, the detector cards $36_{a-h}$ may rest in troughs 61 fixedly mounted by conventional means to the underside of table top 22. The troughs 61 are provided such that detector cards $36_{a-h}$ may preferably rest about 2 inches below the upper surface of table top 22. Plexiglass sheets 63 may be located in each of the slots covering the detector cards $36_{a-h}$ so that the upper surface of a plexiglass sheet 63 is flush with the upper surface of table top 22. The plexiglass sheets provide protection from contaminants to detector cards $36_{a-h}$ and provide a smooth working surface on table top 22.

Detector cards $36_{a-h}$ are preferably of a known construction and are provided to sense movement. Such sensors are available, for example, from Mark Tech International, 5 Hemlock Street, Latham, N.Y. 12110. In particular, each detector card includes a photo transistor 62 which will become electrically conductive when the intensity of light incident thereon drops below a predetermined, variable level. The transistor 62 therefore acts as an electrical circuit switch, which is open when the light received is above a certain level and is closed when the light received is below that level. The point at which the transistor becomes conductive may be varied with a conventional potentiometer.

Thus, in practice, when an operator reaches for an inventory article located behind a particular detector card, the movement of either the operator's hand or the article itself will obstruct at least a portion of the light from florescent lamps 56 contacting the photo transistor 62 in the detector card. With the reduction of light to the photo transistor 62, transistor 62 becomes conductive to thereby indicate selection of the inventory article and to turn on a light emitting diode ("LED") L1 provided on that detector card. As explained below, each detector card $36_{a-h}$ additionally transfers a signal to the accumulator card 38 upon detecting selection of an inventory article. The photo transistor 62 may be calibrated to be very sensitive and to become conductive with only a slight reduction in the amount of light received. Thus, even a shadow cast upon the transistor 62 from the operator's hand or inventory article may be sufficient to indicate correct article selection. If a particular detector card is too sensitive, so that for example it is sensing selection of an inventory article behind an adjacent detector card, the potentiometer may be adjusted to slightly desensitize that card. Alternatively, a sleeve 64, as shown in FIGS. 5 and 6, may be fitted over transistor 62 to confine the boundaries over which transistor 62 is sensitive solely to the area of the associated detector card 36.

Figure 7:
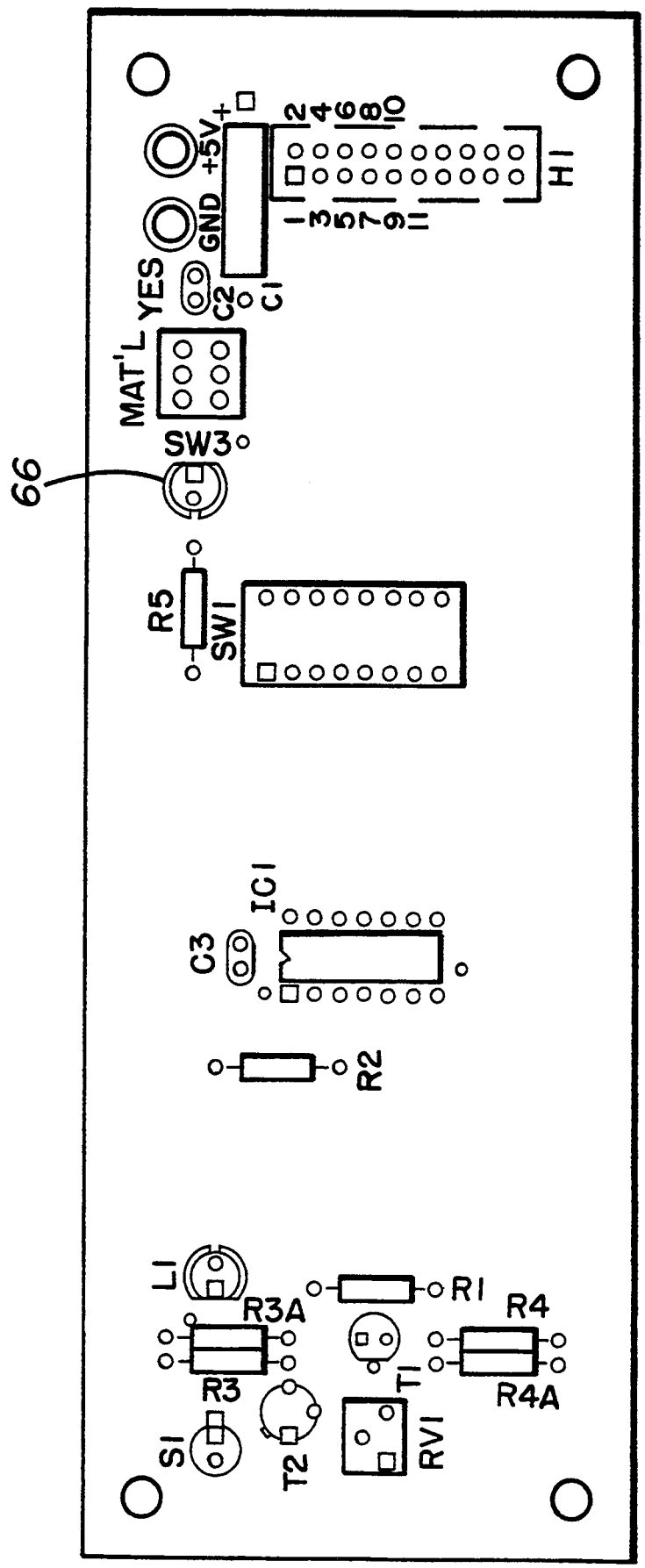
FIG. 7 is a schematic representation of a detector card according to the present invention.
Figure 8:
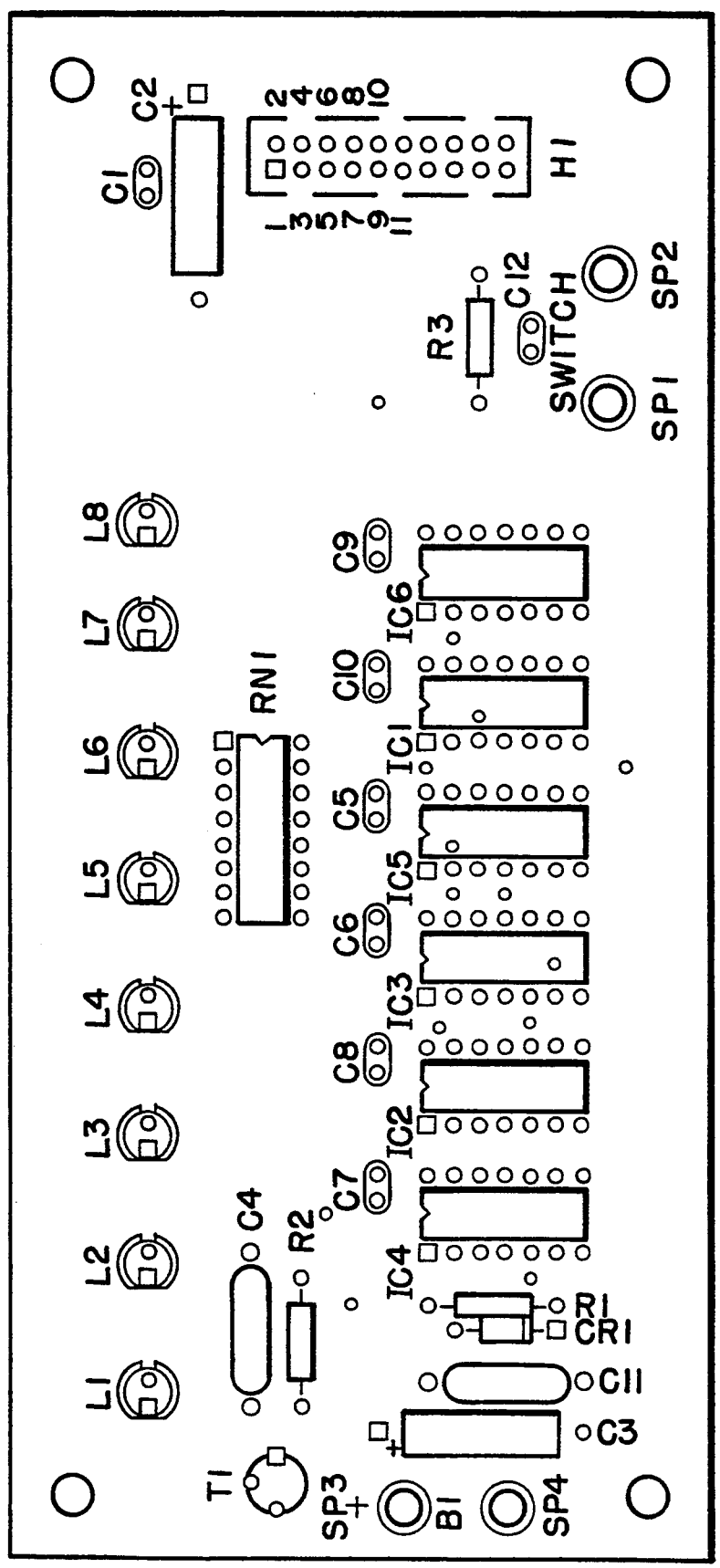
FIG. 8 is a schematic representation of an accumulator card according to the present invention.

In some instances less than all of the inventory points may be used, as for example when the number of inventory articles to be integrated is less than the total number of detector cards. In these instances, the unused detector cards may be deactivated. As shown in FIG. 7, detector cards $36_{a-h}$ each include a toggle switch 66, normally in a first position whereby the detector card is enabled to sense movement. When a particular detector card (or cards) is not to be used, as when there are no inventory articles provided behind that card, the toggle switch 66 of that card may be switched to a second position to deactivate that card. Deactivation of one or more detector cards will not effect the remaining cards.

Accumulator card 38 may be provided to maintain a visual record of which detector cards $36_{a-h}$ have sensed selection of an inventory article, and to reset the detector cards $36_{a-h}$ upon complete selection of all inventory articles after a selection cycle. Accumulator card 38 may be positioned by an operator in either of two troughs located in slots 72 and 74. The troughs are preferably of similar construction to troughs 61. In a preferred embodiment, when a selection cycle proceeds from right to left, accumulator card 38 may be provided in slot 72, as shown in FIG. 2. Alternatively, when a selection cycle proceeds left to right, accumulator card 38 may be provided in slot 74. Thus, regardless of in which direction the selection cycle proceeds, at the completion of the cycle, the accumulator card 38 is provided nearest the operator's line of vision and a minimal amount of time is spent checking and resetting the sensors.

Accumulator card 38 preferably includes 8 LEDs numbered sequentially (L1 through L8 on FIG. 8), corresponding to each of the accumulator cards $36_{a-h}$. Each of the detector cards $36_{a-h}$ is connected to the accumulator card 38 via ribbon connectors 76 (FIG. 6) so that as a particular detector card senses the selection of an inventory article, the corresponding LED on the accumulator card 38 lights in addition to the LED on that particular detector card. At the close of a selection cycle, the operator pushes a reset button 78 (FIG. 1) provided on table 20. If each of the inventory articles have been properly selected and the appropriate LEDs on the detector cards $36_{a-h}$ and the accumulator card 28 are lit, the system will reset, all of the LEDs will be turned off, and the operator is ready to begin another selection cycle. However, if an inventory article has been missed, upon pressing reset button 78, an alarm will activate and the system will not reset. The alarm may be an audio and/or visual signal. Once the alarm is activated, the operator examines the accumulator card 38 and/or the detector cards $36_{a-h}$ to see which LED or LEDs are not lit. The unlit LED(s) indicate that the corresponding inventory article(s) have been missed during the cycle. The overlooked article or articles may then be selected and the system reset. In this way, incomplete integration of inventory articles may be efficiently avoided.

Ribbon connectors 76 may preferably be provided with connector pieces at both ends that allow the detector cards $36_{a-h}$ and the accumulator card 38 to be easily detached therefrom or operably connected thereto. Thus, a detector card and/or accumulator card may be quickly moved or replaced. The detector cards $36_{a-h}$ and the accumulator card 38 preferably operate off of a 12 volt power supply, which power is supplied by the power supply couplings 42 or 44.

Figure 9:
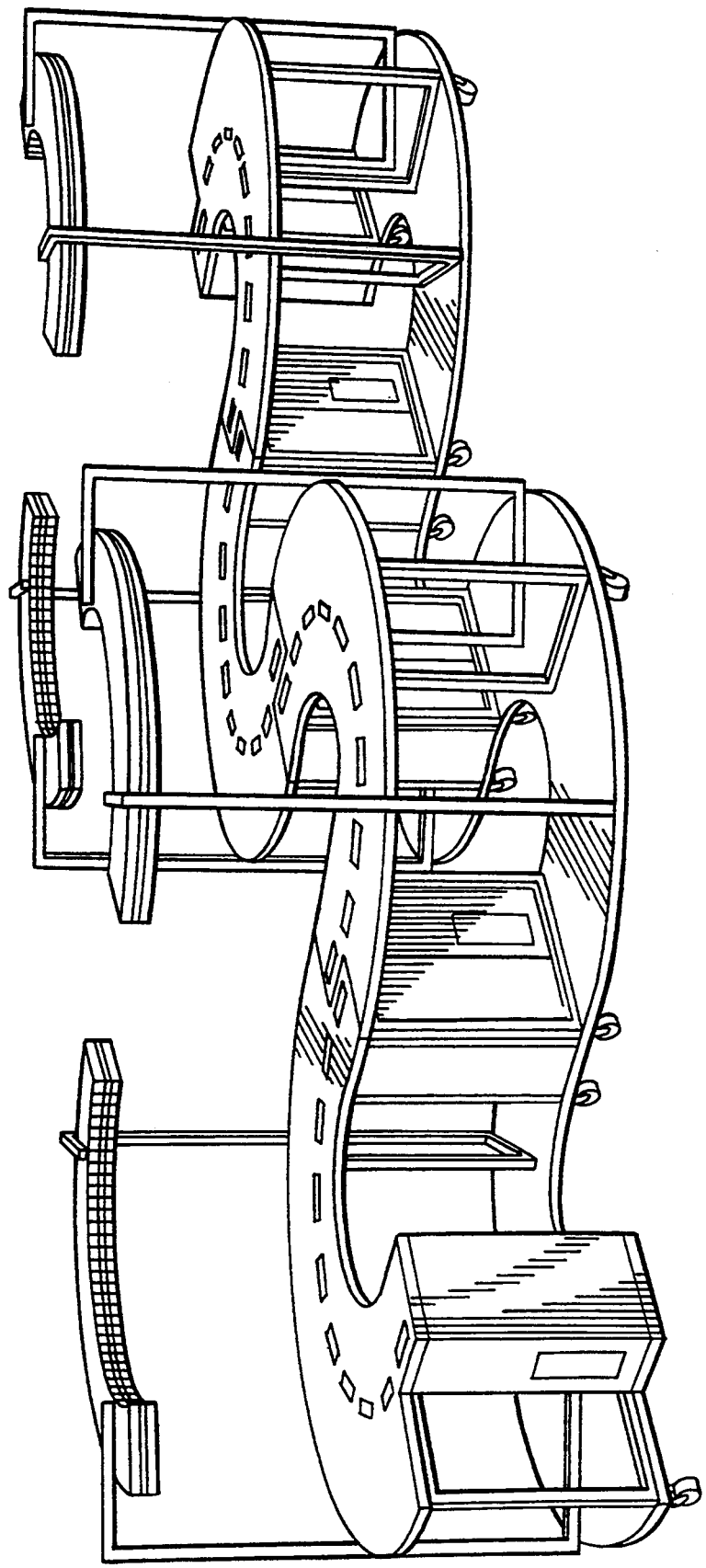
FIG. 9 is an isometric view of a number of interconnected work stations according to the present invention.

As shown in FIG. 9, a plurality of work station tables 20 may be connected end to end thereby forming a row of work stations in a zig-zag fashion. As described above, each of the tables may be electrically connected to each other via a connector cable plugging into the power supply coupling 44 or 46 in adjacent work station tables 20, with the work station table 20 on either end of the row connecting to a conventional 110 volt power supply. By interconnecting a number of work stations according to the present invention, large scale assembly or packaging of inventory articles may be accomplished in a quick, efficient and error free fashion.

Conventional work station tables operate at an approximate rate of 2,000 or more DPM (defects per million). A substantial number of tests have been run in which inventory articles have been assembled and/or packaged using work station tables according to the present invention. The DPM rate in each of those tests was zero; that is, there has never been a missed inventory article upon completion of assembly or packaging using work stations according to the present invention. Moreover, the output using the work station tables according to the present invention has increased approximately 50% to 100% as compared with conventional work station tables. This is primarily due to the fact that operators integrating inventory articles using conventional work stations could only be responsible for an average of 2 to 3 different type inventory articles. With conventional work stations, raising the average number of inventory articles above 2 or 3 per selection cycle resulted in an unsatisfactorily high rate of missed articles and defective product integration. However, with the present invention, each work station table has averaged approximately 6 to 7 inventory articles (that number would be higher but for the fact that there are generally less than the maximum number of allowable inventory articles in any given integration process). Furthermore, as the present invention allows for a greater number of inventory articles to be integrated together at any given station, there has been a reduction in manpower of 25% to 50%. Thus, as compared to conventional work stations, the test results show that the present invention allows integration of a larger volume of inventory articles with fewer operators, which integration has been defect-free.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

I claim:

1. A work station table for facilitating selection of a plurality of inventory articles during a selection cycle for integration into a group, comprising:
   sensing means in the work station table for detecting selection into the group of each inventory article of the plurality of inventory articles; and
   monitoring means in said work station table responsive to said sensor means for indicating selection of less than all of the plurality of inventory articles into the group upon completion of the selection cycle.

2. The work station table recited in claim 1, wherein said sensing means comprises a plurality of sensors, an inventory article of said plurality of inventory articles being associated with a sensor of said plurality of sensors, said sensor including:
   a first state wherein said sensor has not detected movement proximate to said associated inventory article; and
   at least a second state wherein said sensor has detected movement proximate to said associated inventory article.

3. The work station table recited in claim 2, wherein said sensor comprises a photo transistor.

4. The work station table recited in claim 2, wherein said monitoring means comprises a plurality of monitors, said sensor communicating with a monitor of said plurality of monitors, said monitor including:
   a first condition wherein said sensor is in said first state; and
   at least a second condition wherein said sensor is in said second state.

5. The work station table recited in claim 4, further comprising indicating means for indicating when said monitor is not in said second condition upon completion of the selection cycle.

6. The work station table recited in claim 2, further comprising indicating means for indicating when said sensor is not in said second state upon completion of the selection cycle.

7. The work station table recited in claim 2, wherein said first state is indicated by a de-energized light emitting diode and said second state is indicated by an energized light emitting diode.

8. The work station table recited in claim 4, wherein said first condition is indicated by a deenergized light emitting diode and said second condition is indicated by an energized light emitting diode.

9. The work station table recited in claim 5, wherein said indicating means is an audible sound.

10. The work station table recited in claim 5, wherein said indicating means is visual alarm.

11. The work station table recited in claim 1, further comprising a light source for illuminating the work station table.

12. A work station table wherein an operator selects a plurality of inventory articles during a selection cycle for integration into a product, comprising:
   a plurality of inventory points on the work station table, each inventory point of said plurality of inventory points having at least one inventory article of said plurality of inventory articles thereat;
   sensing means provided at said each inventory point for sensing selection of an inventory article of said at least one inventory article at said each inventory point;
   monitoring means in said work station table for indicating when said sensing means does not sense selection of said inventory article at at least one inventory point of said plurality of inventory points upon completion of the selection cycle.

13. The work station table recited in claim 12, wherein said sensing means comprises a sensor, said sensor including:
   a first state wherein said sensor has not detected movement at an inventory point of said plurality of inventory points where said sensor is provided; and
   at least a second state wherein said sensor has detected movement at said inventory point.

14. The work station table recited in claim 13, wherein said sensor comprises a photo transistor.

15. The work station table recited in claim 13, wherein said monitoring means comprises a plurality of monitors, each said sensor having an associated monitor of said plurality of monitors, said monitor including:
   a first condition wherein said sensor associated with said monitor is in said first state; and
   at least a second condition wherein said sensor associated with said monitor is in said second state.

16. The work station table recited in claim 15, further comprising indicating means for indicating when each said monitor is not in said second condition upon completion of the selection cycle.

17. The work station table recited in claim 13, further comprising indicating means for indicating when each said sensor is not in said second state upon completion of the selection cycle.

18. The work station table recited in claim 15, further comprising resetting means for resetting each said sensor to said first state and for resetting each said monitor to said first condition upon each said monitor being in said second condition at completion of the selection cycle.

19. A work station table for facilitating selection of a plurality of inventory articles during a selection cycle for integration into a product, comprising:
   a plurality of sensors, an inventory article of the plurality of inventory articles being associated with a sensor of said plurality of sensors, said sensor including:
      a first state wherein said sensor has not detected movement proximate to said associated inventory article, and
      at least a second state wherein said sensor has detected movement proximate to said associated inventory article;
   a plurality of monitors, said sensor communicating with a monitor of said plurality of monitors, said monitor including:
      a first condition wherein said sensor is in said first state, and
      at least a second condition wherein said sensor is in said second state; and
   indicating means for indicating when said monitor is not in said second condition upon completion of the selection cycle.

20. The work station table recited in claim 19, further comprising a light source for illuminating the work station table.

21. A work station table for facilitating selection of a plurality of inventory articles during a selection cycle for integration into a product, comprising:
   a plurality of sensors, an inventory article of the plurality of inventory articles being associated with a sensor of said plurality of sensors, said sensor including:
      a first state wherein said sensor has not detected movement proximate to said associated inventory article, and
      at least a second state wherein said sensor has detected movement proximate to said associated inventory article; and
   indicating means for indicating when said sensor is not in said second state upon completion of the selection cycle.

22. The work station table recited in claim 21, further comprising a light source for illuminating the work station table.

23. A system for mass production of a product, comprising:
   a plurality of interconnected work station tables for facilitating selection of a plurality of inventory articles during a selection cycle for integration into the product, a work station table of the plurality of work station tables including:
      sensing means in said work station table for detecting selection of each inventory article of said plurality of inventory articles; and
      monitoring means in said work station table responsive to said sensing means for indicating selection of less than all of the plurality of inventory articles into the product upon completion of said selection cycle.

* * * * *